United States Patent [19]

Kionka

[11] Patent Number: 5,361,357
[45] Date of Patent: Nov. 1, 1994

[54] METHOD AND APPARATUS FOR OPTIMIZING COMPUTER FILE COMPILATION

[75] Inventor: Daniel P. Kionka, San Jose, Calif.

[73] Assignee: Cadence Design Systems, Inc., San Jose, Calif.

[21] Appl. No.: 861,939

[22] Filed: Apr. 2, 1992

[51] Int. Cl.$^5$ .............................................. G06F 9/45
[52] U.S. Cl. .................. 395/700; 364/280.4; 364/283.3; 364/283.4; 364/DIG. 1
[58] Field of Search ................................ 395/650, 700

[56] References Cited

U.S. PATENT DOCUMENTS

| | | | |
|---|---|---|---|
| 4,558,413 | 12/1985 | Schmidt et al. | 395/600 |
| 4,667,290 | 5/1987 | Goss et al. | 364/300 |
| 5,170,465 | 12/1992 | McKeeman et al. | 395/700 |

*Primary Examiner*—Gareth D. Shaw
*Assistant Examiner*—John Q. Chavis

*Attorney, Agent, or Firm*—Phong K. Truong; Dennis S. Fernandez; Kenneth M. Kaslow

[57] ABSTRACT

A system and a method are described for optimizing the sequencing and time requirements for compiling large sets of source code residing in multiple hierarchical file directories using an abstracted logical description of the hierarchical file relations existing between directories. The system consists of a logic processor working in concert with input and output file registers, a match register, and an abstracted tree register for the purpose of creating a identifying, comparing, and sequencing file names in a final description of the global directory. The method iteratively identifies the primary input files and the intermediate input files for a given output file for each of a series of directories, inverts the casual relationship between the output file and its intermediary input files, and accumulates and stores these relationships in a sequential manner for subsequent use.

4 Claims, 4 Drawing Sheets

METHOD AND APPARATUS FOR OPTIMIZING COMPUTER FILE COMPILATION

BACKGROUND OF THE INVENTION

1. Field of the Invention

This invention relates to the large scale compilation of software source code, and more particularly, to optimizing the sequence of source code compilations involving source code files residing in numerous different directories.

2. Description of the Background Art

Software programs are generally written in high level languages which are understandable by humans, and which use a set of arbitrary terms to represent computer instructions. These instructions are called "source code." This source code must be converted into a series of instructions which are executable by the computer on which the software is to operate. The converted set of instructions is called the "object code," and the process of conversion to object code is called "compiling." An efficient compilation process requires identifying only those source code files that have been modified in the most recent design cycle, and compiling them in the proper order. Generally, the compiling process for relatively small software projects requires the conversion of several different source code files residing in a single directory. In this instance, determining which files have been modified, and the order of compilation is a relatively straightforward process.

The aspect of the compilation process that determines which files to process and their order is called dependency analysis. Dependency analysis determines the causal relationship between two independent objects. An object depends on another object where a change in the latter requires a change in the former in order to bring each object into the current state. The instruction which effects the change in the object is called the rule associated with this dependency. All dependent relations have rules which express how to bring the dependent object up to date with the object on which it depends. In the software context, an object file such as "file1.object" is dependent on a source code file "file1.source" where where "file1.source" must be compiled to create "file1.object." The instruction to "compile" "file1.source" to produce "file1.object" is the rule associated with this dependency. Any change in "file1.source" requires the execution of the rule to bring "file1.object" into the currency with "file1.source." We can express this relationship diagrammatically as:

[output file] : [input file]
[rule of association]

Most software development systems incorporate some method for determining these dependencies for small sets of source code files residing in relatively few directories, and work with sufficient efficiency. However, in the creation of large scale software projects, such as computer operating systems, the various source code files can reside in hundreds of directories organized into a complicated hierarchical structure, where each directory contains only a fragment of the global hierarchy. In this case, the dependencies becomes increasingly complex, because a single file can be both dependent on numerous files in various directories, and one of the dependents of a file in other directories. These inter-directory relationships are not defined in any single directory and thus there is no global description of the system which can be used to optimally sequence the compilation process. Traditional approaches to expressing the dependencies for an entire system are often unable to determine the dependencies of all the files involved at all, or in an acceptable amount of time. This results in inefficient iterative compilations of various fragments of a software system: certain files are compiled unnecessarily, repeatedly, or both. This substantially increases compilation times. What is needed is a system for determining the minimal set of dependencies for files residing in numerous directories, and for specifying their compilation sequence in order to avoid unnecessary or duplicative compilations.

In accordance with the present invention, a tree abstraction apparatus and method are described for determining the dependencies of source code files residing in multiple directories, and for determining the optimal compilation order.

Tree abstraction identifies the "by-products" of a set of dependencies and then expresses the top-level dependency in terms of the bottom-level inputs on which it depends. The by-products are the intermediate dependencies between the bottom level inputs (or "leaf dependencies," which depend on nothing and are thus assumed to be always up to date) and the top level output. By expressing the top-level dependency only in terms of up-to-date leaf dependencies, one automatically ensures that all intermediate dependencies will also be kept up to date.

The basic goal of tree abstraction is to filter out as much of the dependency tree as possible by taking advantage of two standard conventions used when maintaining separate trees within a system. First, there are a small number of top-level targets that are defined in each tree that will produce "the system" when they are all made up-to-date. In the software context, this means that there are relatively few files which are the ultimate output of the compilation of many files. Second, the intermediate targets (by-products) of some trees are the leaf dependencies of others. That means that the relationships between trees can be determined given only the list of top-level targets, by-products, and leaf dependencies of each tree. In the software context, this means that the global hierarchical relations between the directories can be expressed in terms of the main output files for the directories, the intermediate input files, and the bottom level source code or other input files which must be compiled to create the software program.

The other important aspect is that from the higher level point of view, the by-products depend on their top-level target, which reverses their real causal relationship, but not their logical relationship. That is because the top-level targets are the only interface to the individual trees, and a by-product can only be brought up-to-date by processing its corresponding top-level target. The abstracted tree can determine whether the top-level target is up-to-date because it directly depends on all its leaf dependencies. If anything at all is out of date, the individual trees must be processed to determine the exact commands to run.

Extracting by-products enables the determination of the minimal set of updating actions required to bring the top-level target up to date. When applied over a large number of dependencies this can result in a significant savings in computing time. In addition, abstraction allows one to express the minimal set of dependencies between two or more trees. If each tree represents one source code directory, applying the abstraction to a set of trees will determine the order in which the compilations should be run in each of the directories and will also identify any directories which are up to date and do not need to be processed.

Tree abstraction therefore provides a means of efficiently calculating the minimal set of compilations which need to be run in order to bring a specified target up to date. Without this ability, it would be necessary to iterate through all directories, compiling in each one. In fact, one would have to perform this iteration multiple times, since compiling in one directory might make a previous directory out of date. The tree abstraction method puts a bound on the problem, and also assures minimal processing time.

In summary, the tree abstraction method extracts from a series of incomplete local hierarchical directories the critical inputs and intermediate inputs for a given set of main outputs from each directory, and creates a minimal description of the global hierarchy that expresses the logical dependent relations between the directories. This global description is a minimal description because it expresses only the logical inter-directory dependency relations; it is optimized because establishes the order in which the objects in various directories must be processed in order to update the entire system in a single pass, without repeated or unnecessary processing.

The apparatus for executing the preferred embodiment of the method of the present invention contains a processor, a keyboard, a display terminal and a plurality of uniquely configured registers and data storage devices connected to the processor along a common data bus. These memory registers include: a directory file register which contains the names of the directories to be processed; a directory description register which contains the hierarchical relations in each directory to be processed; a main output file register containing the names of the main output files for a given directory; a by-products register, which contains the names of the files identified as intermediate input files for a given main output file of a directory; a leaf dependency register which contains the names of the files determined to be the primary inputs for a given main output file of a directory; an abstracted tree register for maintaining the accumulated description of the directories as they are processed; and a match register for temporarily holding to items for comparison.

DESCRIPTION OF THE PREFERRED EMBODIMENT

Figure 1:
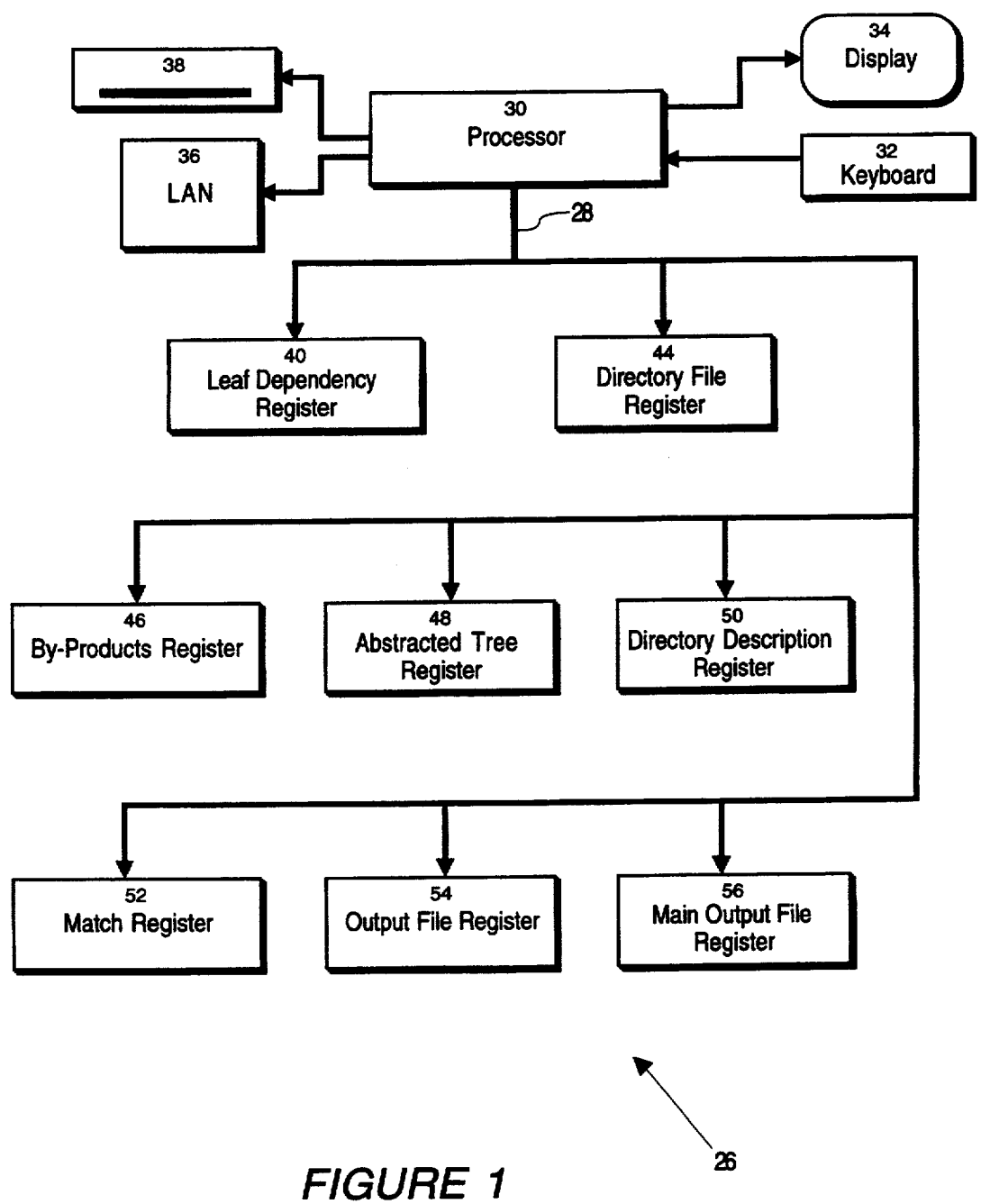
FIG. 1 is block diagram showing the preferred embodiment of the apparatus of the present invention.

The preferred steps of the present invention are implemented on a general purpose computer, such as manufactured by Sun Microsystems, Inc. of Mountain View. Calif., running under the UNIX operating system. Referring now to FIG. 1, the preferred system 26 comprises a processor 30, a display 34, a keyboard, and a printer 38. Processor 30 is attached to other processors 30 and systems 26 through local area network 36. Processor 30 is further connected to a set of storage devices and memory registers through data bus 28. These memory registers include: directory file register 44, which contains the names of the directories to be processed; directory description register 50, which contains the hierarchical relations in each directory to be processed; main output file register 56, for containing the names of the main output files for a given directory; by-products register 46, which contains the names of the files identified as intermediate input files for a given main output file of a directory; leaf dependency register 40, which contains the names of the files determined to be the primary inputs for a given main output file of a directory; abstracted tree register 48, for maintaining the accumulated description of the directories as they are processed; output file register 54 for storing the minimal global hierarchical description produced by the method of the present invention; and match register 52, for temporarily holding items for comparison.

Figure 2A:
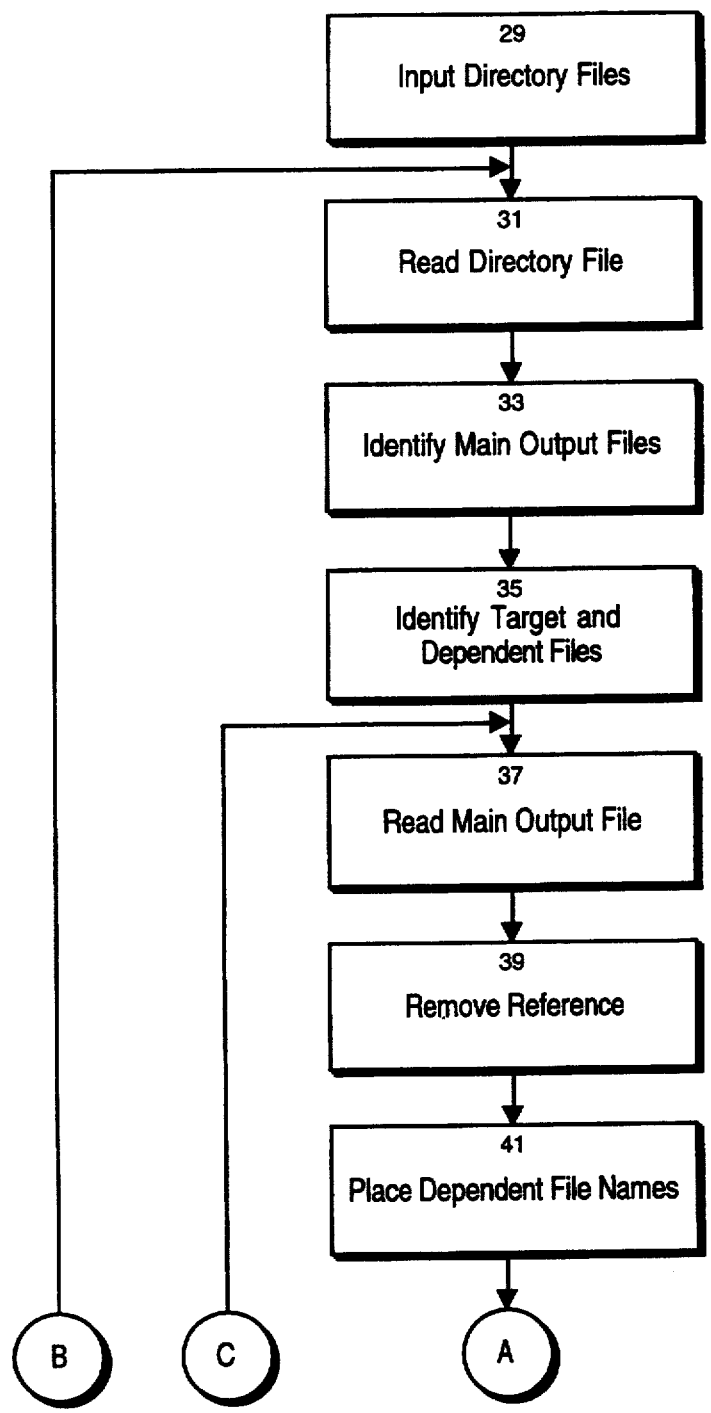
FIG. 2(a)-(c) is a block diagram showing the preferred steps of efficiently implementing the process of the present invention.

Referring now to FIG. 2(a), in step 29, processor 30 begins the dependency abstraction process by storing into directory file register 44 (FIG. 1) the names of the file directories for which the dependency relations are to be abstracted. At step 31, a loop is initiated, in which processor 30 iteratively reads directory files from directory file register 44. At step 33, the user provides an input to processor 30 through keyboard 32 and specifies the main output files of that directory, along with the rule associated with each of these main output files. Processor 30 places the file names of these files, and the associated rule into main output file register 56. Next, at step 35, the user inputs into directory description register 50 a hierarchical description of the directory, identifying for each file in the directory, whether that file is the output of another file. If the directory file is the output file of another file, the input files of that directory file are also identified. Each output/input file relation in that directory is appended to directory description register 50 in the following format:

Output File: Input File

In implementing this process in a UNIX based operating system, the output/inputs relations in each directory are contained in a Makefile, the construction and specifications of which follow standard UNIX conventions. (see Addendum A1). The contents of a directory makefile would be read at step 35 into directory description register 50. The use of Makefiles, or their analogs in other systems, allows for the efficient analysis of the dependency relations between directories.

In step 37, processor 30 reads from main output file register 56 the name of the first main output file for the first directory included in directory description register 50. In step 39 the reference to this main output file is removed, along with its input files, from the description of this directory in directory description register 50. In step 41 the names of input files for this main output file are placed in leaf dependency register 40. These steps parse the various components of each dependency relationship that exists in directory description register 50 with respect to the main output file.

Figure 2B:
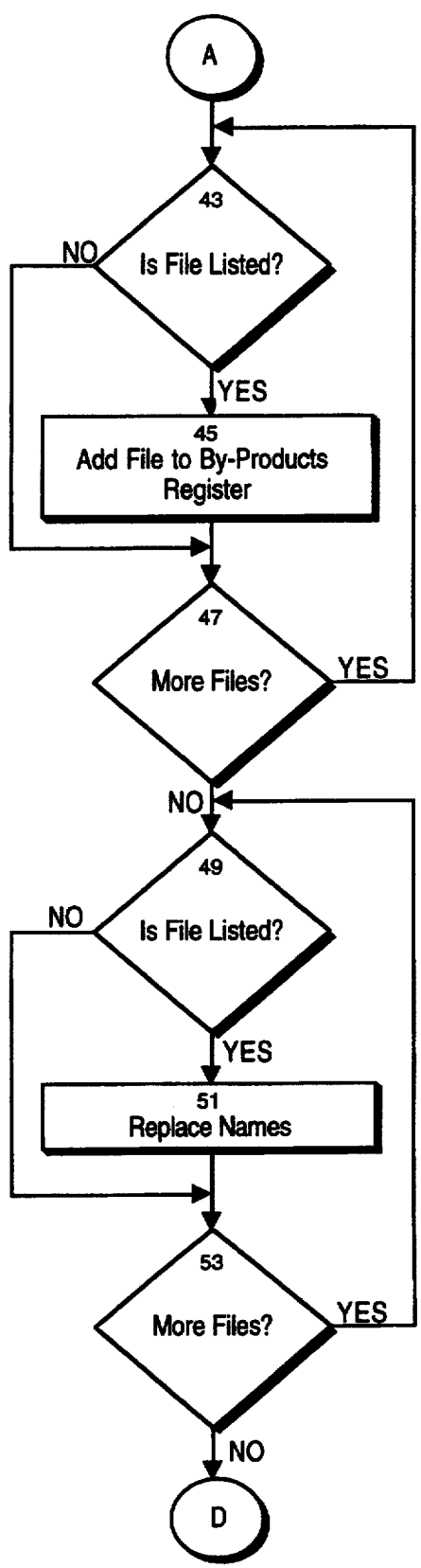

Referring now to FIG. 2(b), a second iterative loop is begun in step 43, where the name of each file in leaf dependency register 40 is compared in match register 52 with the names of each of the output files in directory description register 50. Step 43 tests whether the name of the file in leaf dependency register 40 is the name of one of the output files in directory description register 50. If the file name tested is found in directory description register 50 as an output file, then in step 45 the file name is removed from leaf dependency register 40, and added to by-products register 46; the input file names for this file are copied from directory description register 50 to leaf dependency register 40. If the file name in step 43 is not found in directory description register 50, step 45 is skipped. Step 47 verifies that all files listed in leaf dependency register 40 have been tested for further dependencies. If all files have been tested, then the process continues with step 49.

The purpose of the iterative loop of steps 43 to 47 is to distinguish, for the main output file of a directory, between those files which are the primary inputs for the output file (leaf dependencies) and those files which are intermediary inputs (by-products). The leaf dependency files are those files in the given directory that must be updated in order to update the output file. By checking to see if each putative leaf dependent file in fact is the output of another file, and then processing each of these files recursively, the process determines the primary inputs for the given main output file. Once the true leaf dependents are identified, updating the leaf dependency files will, by the hierarchical nature of the file directory, force the by-product files to also be updated. Identifying the leaf dependent files is critical to the final optimization of the hierarchical tree because files that are leaf dependencies within one directory may also be the by-products or the main outputs of another directory. Once the by-products and leaf dependency files are identified, the process can then construct the abstracted tree that embodies the optimized representation for processing the files.

In step 49, a third iterative loop is initiated, here testing in match register 52 whether each file listed in by-products register 46 is listed in directory description register 50 as an input for another file. If the file is so listed, then in step 51, the name of the by-product file is replaced with the name of the main output file from main output file register 56 currently being processed at step 37. Step 53 tests whether all the files in by-products register 46 have been processed.

This loop replaces each of the files that are the by-products of the main output file with that main output file's name, where those by-product files are contained in directory description register 50 as the inputs for another file. The purpose of this replacement is to establish the minimal hierarchical relationship between two causally related files, without describing each of the intermediate files which link the various output and input files in a given dependent relation. For example, if A is an output file which is dependent on B which in turn is dependent on C, then C is the leaf dependency of A, and B is a by-product. If D is also dependent on B, then it is sufficient to say that D is dependent on A; this is the result of replacing by-product B with its main output A. Updating C will force A to be updated, which in turn will force D to be updated also.

Figure 2C:
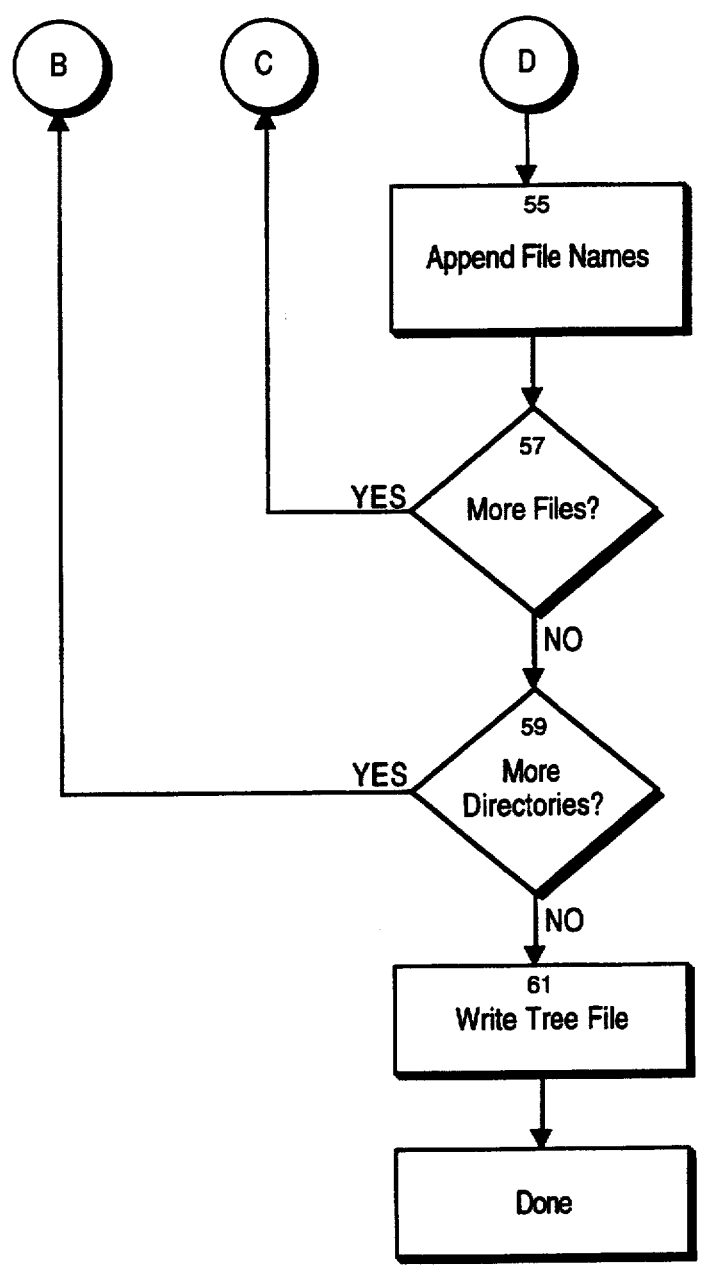

Step 55, in FIG. 2(c), is the creation of the abstracted tree that represents the minimal description of the hierarchical dependency relationships existing between various directories. The abstracted tree is created by writing to abstracted tree register 48 the file names of the main output file, the rule associated with the main output file, the by-products, and the leaf dependents, from their respective registers, 56, 46, and 40. The sequence which these files must be written in is:

By-products : Main Output File
    Main Output File : Leaf Dependency Files
               Rule of association for main output file.

The sequencing of the first lines inverts the causal relationship between the by-products and the main output file, and in effect, locally states that the by-products depend on the main output file. (Compare with sequencing found in directory description register 50, described above). While this local statement is an incorrect causal description, it is a globally correct logical description, since, as explained above, once the main output file is updated, the by-products must also be updated. Accordingly, from a global perspective, which is what the abstracted tree represents, the relationship between the by-products and the main output file is correctly expressed in this fashion.

Thus, this specific sequence is necessary to properly create the optimized representation of the inter-directory dependencies. As the abstracted tree register will contain, on completion, the representations of each of the directories specified in the system, listing the main output file as the dependent of its by-products will produce a net minimal description of the logical relationships of files across directories, with each file identified with both its local and global hierarchical relations.

When the abstracted tree file is used to update the selected directories, the associated rule is needed to serve as the instruction which defines the type of causal relationship between the files, even if this relationship exists only at the directory level. For example, in the UNIX environment, the associated rule for the files in an abstracted tree will often be "make [filename]". The "make" rule instructs the operating system to execute the makefile for filename; this makefile in turn contains the specific rules which associate the various files, and which will be executed when the system is updated.

The remaining steps complete the iterative processing of the main loops. Step 57 tests to see whether there are additional main output files identified in main output file register 56. If so, then the loop is repeated from step 37, where the next main output file for the directory is read from main output file register 56. Processing from step 37 then continues in the same sequence described above. When the main output files for the directory are all processed, then abstracted tree register 48 will contain descriptions for all main output files in this directory. Once all of the main output files have been processed, then step 59 determines whether there is another directory listed in directory file register 44. If so, then processing is repeated for this directory, and for all of its main output files from step 31. Once all directories are processed, then step 61 writes abstracted tree register 48 to output file register 54. (see Addendum A2 for an example of this in the Unix environment.) This final abstracted tree contains the minimal global hierarchical description of the directories specified in directory file register 44. This abstracted tree file can then be used repeatedly as the input file describing the sequence by which the various files in the different directories are to be updated. This abstracted tree remains a valid description of the file directory hierarchy until any of the hierarchical relationships in a directory are changed.

ADDENDUM

The attached source code documents represent a preferred embodiment of the method of the present invention.

Typical Set of Makefiles

```
Makefile for dir1 all: prog1
install: ../install/prog1

../install/prog1: prog1
        cp prog1 $@ prog1: ../install/lib2 obj1.o obj1.o: obj1.h
```

```
Makefile for dir2 all: lib2
install: ../install/lib2

../install/lib2: lib2
        cp lib2 $@ lib2: obj2.o obj2.o: obj2.c obj2.h ../install/inc3.h
```

```
Makefile for dir3 all:
install: ../install/inc3.h

../install/inc3.h: inc3.h
        cp inc3.h $@
```

```
Super Makefile all: install/prog1 install/prog1: make_dir1 make_dir1: make_dir2
        cd dir1; make install make_dir2: make_dir3
        cd dir2; make install make_dir3: NONEXISTENT
        cd dir3; make install

NONEXISTENT:
```

Output of smake, modified smf

```
1# dir*/Makefile | smake >smf        # smake dir*/Makefile >smf
```

```
make -n -f smf install/prog1
```

---

```
+ smake
+ ls dir1/Makefile dir2/Makefile dir3/Makefile
smake: Processing dir1/Makefile
smake: Processing dir2/Makefile
smake: Processing dir3/Makefile
+ make -n -f smf install/prog1
        cd dir3 ; make install
        cd dir2 ; make install
        cd dir1 ; make install
```

---

| Order done | Contents of "smf" |
|---|---|
|  | dir1/MAKE_INSTALL : ; cd dir1 ; make install |
| 1 | dir1/obj1.o : dir1/MAKE_INSTALL<br>install/prog1 : dir1/MAKE_INSTALL<br>dir1/prog1 : dir1/MAKE_INSTALL<br>dir1/all : dir1/MAKE_INSTALL |
| 1.1 (file) | dir1/MAKE_INSTALL : dir1/obj1.h |
| 1.2 | dir1/MAKE_INSTALL : install/lib2 |
|  | dir2/MAKE_INSTALL : ; cd dir2 ; make install |
| 1.2.1 | dir2/obj2.o : dir2/MAKE_INSTALL<br>install/lib2 : dir2/MAKE_INSTALL<br>dir2/lib2 : dir2/MAKE_INSTALL<br>dir2/all : dir2/MAKE_INSTALL |
| 1.2.1.1 (file) | dir2/MAKE_INSTALL : dir2/obj2.c |
| 1.2.1.2 (file) | dir2/MAKE_INSTALL : dir2/obj2.h |
| 1.2.1.3 | dir2/MAKE_INSTALL : install/inc3.h |
|  | dir3/MAKE_INSTALL : ; cd dir3 ; make install |
| 1.2.1.3.1 | install/inc3.h : dir3/MAKE_INSTALL<br>dir3/all : dir3/MAKE_INSTALL |
| 1.2.1.3.1.1 | dir3/MAKE_INSTALL : dir3/inc3.h |

---

```perl
#! /usr/local/Public/bin/perl -w

# smake -- super makefile generator

Configuration constants

@TARGET_LIST = ("installheaders", "install");
$PREFIX = "MAKE_";
$SPREFIX = "SUPER_";
$TOP_TARGET = "supermake";

$mypath = $0;
$mypath =~ s,(.*)/.*,$1,;
@INC = (@INC, $mypath);
require "make.pl";

defined &addDir             || die;
defined &readMAKE           || die;
defined &abstract_makefile  || die;
defined &print_abstracted   || die;

Subroutines sub superTarget {
    local($starget);
    $starget = $SPREFIX . $_[0];
```

```
    $starget =~ tr/a-z/A-Z/;
    return $starget;
} doOneMakefile
-------------

# Abstract a Makefile (or group of Makefiles treated as a single, virtual
# Makefile), into a simpler Makefile with a small set of layered targets
# (usually installheaders and install).

# (The code for groups of Makefiles is way out-of-date.)

sub doOneMakefile
{
    local(@filelist) = @_;
    local($ret);

foreach $file (@filelist) {
        chdir($topdir) || die "Can't chdir back to $topdir, $!\n";
        print STDERR "$0: Processing $file\n";
        if ( ! -r "$file" ) {
            print STDERR "$0: Can not read $file\n";
            next;
        } if ($file !~ m#/#) {
            $file = "./" . $file;
        }
        $file =~ m#(.*)/(.*)#;
        $dir = $1;
        $mfile = $2;

if ( "$dir/$mfile" ne $file ) {
            print STDERR "$0: Can not disect $file\n";
            next;
        } chdir($dir);
        $dirpwd = `pwd`;
        chop($dirpwd);

print "# From directory: $dirpwd\n";
        print "\n";

$make_pipe = "MAKE";
        # /bin/make may be better, but it does not generate "NONEXISTENT:"
        open($make_pipe, "make -rpf $mfile NONEXISTENT 2>/dev/null |");
        &readMAKE($make_pipe, $dir, "/usr/include");

foreach $target (@TARGET_LIST) {
            $dirtarget = &addDir($target, $dir);
            $ret = &abstract_makefile($dirtarget);
            if ($ret) {
                print "$dirtarget : ; \$[SMAKECMD] $dirtarget\n";
                print "clean :: ; rm -f $dirtarget\n";
                $starget = &superTarget($target);
                print "$starget : $dirtarget\n";
                #print "$TOP_TARGET : $starget\n";
                print "\n";
            }
        } if ($ret) {
        #    print "$TOP_TARGET : $dirtarget\n";   # just the last target
        #    print "\n";
        #}
    }

# Somehow print a rule for the virtual makefile group.
    #print "$dirpack : ; echo @filelist\n";
    #print "\n";
```

```perl
    &print_abstracted(STDOUT, $dir, "");
    print "\n";
}

# Mainline
-------- if (@ARGV > 0) {
    @TARGET_LIST = (@ARGV);
    print STDERR "TARGET_LIST = @TARGET_LIST\n";
}

$topdir = `pwd`;
chop($topdir);

# Make STOP_TARGET the first rule for a good default target.
# Also generate required overhead.
foreach $target (@TARGET_LIST) {
    $starget = &superTarget($target);
    print "STOP_TARGET : $starget\n";
    print "$starget :\n";
}
#print "STOP_TARGET:\n";
print "\n";
print ".SUFFIXES: .dummy\n";
print "\n";
print ".DEFAULT:\n";
print ' echo Dummy rule for $@', "\n";
print "\n";
print "SMAKECMD = echo\n";
print "SHELL = /bin/sh\n";
print "\n";

while (<STDIN>) {
    $files = $_;
    @filelist = split('\s', $files);
    &doOneMakefile(@filelist);
}
# make.pl -- makefile analyser

# User functions:
#       readMAKE
#       mark_targets
#       abstract_makefile
#       print_abstracted

# %rels
# -----

# This associative array holds all the dependency information for the makefile.
# The key is the target, and value is an joined list of a flag string and the
# dependency list.  The flag string is two letters, xy, where:
#       x = m,M  marked flag (found in a recursive search)
#       y = D    dependency only
#       y = T    target
#       y = S    sub-makefile target
y = A    abstracted away %rels = ();              # relationships between targets and dependencies

Other variables $debug_dump   = 0;
$debug_change = 0;

# ------------
# Subroutines
# ------------
```

```perl
sub dump_log {
    print STDERR "DUMP: ", @_, "\n" if $debug_dump;
} sub change_log {
    print STDERR "LOG: ", @_, "\n" if $debug_change;
} sub stripDotDot {
    local($filename) = @_;
    local(@path) = split(/[\/\n]/, $filename);
    local(@newpath) = ();
    # if (($#Fld == 0)) { return ""; } foreach $component (@path) {
        next if $component eq '.';
        # pop(@newpath),next if $component eq '..';
        if (($component eq '..') &&
                ($#newpath >= 0) && (@newpath[$#newpath] ne '..')) {
            pop(@newpath);
        }
        else {
            push(@newpath, $component);
        }
    }

$newfilename = join('/', @newpath) || '.';
    return $newfilename;
} sub addDir {
    local($name, $dir) = @_;

return $name if ($name =~ /^\//);

if ($dir ne "") {
        $name = $dir . "/" . $name;
    }

&stripDotDot($name);
}

# &readMAKE
# ---------

# Parameters:
#       makefile        name of filehandle of Makefile or "make -p |"
#       prefix          directory name to prepend to all file names.
#       skip_hier       list of directories to ignore
# Output:
%rels           dependencies for each target sub readMAKE {
    local($makefile, $prefix, @skip_hier) = @_;

%rels = ();         # relationships between targets and dependencies
    $prefix = "" if (! defined($prefix));

warn "$makefile empty or non-existent" if (eof($makefile));

while (<$makefile>) {
        $line = $_;
        chop($line);

# Filter out comments and non-dependency lines
        next if ($line =~ /^#/);
        next if ($line !~ /\S+\s*:/); # (What about "a b : c"?)
        next if ($line =~ /^\.SUFFIXES:/);
        $line =~ s/(([^:]*:[^;]*);.*/$1/;       # strip command on same line
        $line =~ s/ #.*//;                      # strip comment on same line
```

```perl
        ($target, $deps) = split(/:+/, $line, 2);
        $target =~ s/\s//g;      # assume one target on left of :
        $deps =~ s/\s*//;
        next if (($target =~ /\.[^.]/) && ($deps eq ""));  # suffix rule

# Create structure for $rels{$target}
        $target = &addDir($target, $prefix);
        @deplist = split('\s+', $deps);
        @r = ("mT");                      # default target flags
        if (defined($rels{$target}) && ($rels{$target} =~ /.T/)) {
            # print "rels{$target} = $rels{$target}\n";
            @r = ($rels{$target});
        }
        dep_loop:
        foreach $dep (@deplist) {
            die if ($dep !~ /\S/);
            foreach $sd (@skip_hier) {
                next dep_loop if ($dep =~ m,^$sd,);
            }
            $dep = &addDir($dep, $prefix);
            $rels{$dep} = "mDp" unless defined($rels{$dep});
            push(@r, $dep);
        }
        $rels{$target} = join(' ', @r);
    }
} clear_marks()
--------------

# Output:
%rels    all marks cleared sub clear_marks {
    foreach $t (keys(%rels)) {
        $rels{$t} =~ s/^M/m/;
    }
} mark_targets()
--------------

# Parameters:
#       target (or list of targets on recursive call)
# Input:
#       %rels    dependencies for each target
# Output:
%rels    all dependencies for target marked sub mark_targets {
    local(@tar_list) = @_;
    local($cur_tar) = @tar_list[$#tar_list];
    local($indent_tar) = " " x $#tar_list . $cur_tar;
    local(@dep_list);                        # for recursion if (! defined($rels{$cur_tar})) {
        $verbose && print "$indent_tar : (Not a target)\n";
        return 0 if ($#tar_list == 0);   # user call
        die "$indent_tar not a target";
    }
    $cur_rel = $rels{$cur_tar};
    @dep_list = split(' ', $cur_rel);
    if ($dep_list[0] =~ /M/) {
        $verbose && print "$indent_tar : (Already checked)\n";
        return 1;
    }
    ($dep_list[0] =~ /m/) || die "Bad target flag: $cur_rel";

if ($#dep_list < 1) {
        $verbose && print "$indent_tar : (No dependencies)\n";
    }
    elsif ($dep_list[0] =~ /.S/) {
```

```perl
            $verbose && print "$indent_tar : (Sub-makefile target)\n";
        }
        elsif ($dep_list[0] =~ /^.A/) {
            $verbose && print "$indent_tar : (Abstracted away)\n";
        }
        else {
            shift @dep_list;                # skip target flag
            foreach $cur_dep (@dep_list) {
                $verbose && print "$indent_tar : $cur_dep\n";
                @cycle = ();
                foreach $prev_tar (@tar_list) {
                    if (($#cycle >= 0) || ($prev_tar eq $cur_dep)) {
                        push(@cycle, $prev_tar);
                    }
                }
                if ($#cycle >= 0) {
                    print STDERR "Cyclic dependency: @cycle $cur_dep\n";
                }
                else {
                    &mark_targets(@tar_list, $cur_dep);
                }
            }
        }

$rels{$cur_tar} =~ s/^m/M/;            # mark checked
    return 1;
}

# &print_abstracted
# ------------------

# Parameters:
#     dumpfile        file to print to
#     skip_tar        do not print target rules for files in this directory
#     skip_dep        do not print dependency rules for files in this dir
# Input:
%rels           dependencies for each target
# Output:
Printout of makefile sub print_abstracted {
    local($dumpfile, $skip_tar, $skip_dep) = @_;
    local(@targets) = sort(keys(%rels));
    local($target);
    local(@dep_list);
    local($dep);

$dumpfile = "STDOUT" if (! defined($dumpfile));

foreach $target (@targets) {
        next if ($rels{$target} =~ /^.[DT]/);   # skip regular tar, dep if (    ($rels{$target} =~ /^.[TA]/)
             && ($skip_tar)
             && ($target =~ m,^$skip_tar/[^/]+$,)) {
            &dump_log("Skip-tar $target, $rels{$target}");
        }
        else {
            @dep_list = split(' ', $rels{$target});
            shift @dep_list;                # skip target flag foreach $dep sort(@dep_list) {
                if (    ($rels{$dep} =~ /^.[DTA]/)
                     && ($skip_dep)
                     && ($dep =~ m,^$skip_dep/[^/]+$,)) {
                    &dump_log("Skip-dep $target: $dep");
                }
                elsif (    ($rels{$target} =~ /^.T/)
                        && ($rels{$dep} =~ /^.[DT]/)) {
                    &dump_log("Skip-other-targets $target: $dep");
                }
                else {
```

```perl
                print $dumpfile "$target: $dep\n";
            }
        }
    }
    1;
}

# &abstract_makefile
# ------------------

# Parameters:
#       top_target      target abstracting for, or "" for all targets
#       fake_top_name   name of dummy target when top_target eq ""
# Input:
%rels           dependencies for each target sub abstract_makefile {
    local($top_target, $fake_top_name) = @_;
    local(@old_list);
    local(@new_list);
    local($ret);

if ($top_target eq "") {
        return 0 if ($fake_top_name eq "");
        defined($rels{$fake_top_name}) && die $fake_top_name, "exists,";
        die "Not implemented,";
    }
    else {
        warn "$fake_top_name not needed," if (defined($fake_top_name));
    }

&clear_marks;
    $ret = &mark_targets($top_target);
    return 0 if (! $ret);
    return 0 if ($rels{$top_target} =~ /^MA/);   # previously abstracted
    ($rels{$top_target} =~ /^M[DT]/) || die "Bad top_target $top_target,";

($dummy, @old_list) = split(' ', $rels{$top_target});
    foreach $dep (@old_list) {
        &change_log("Removed-top $top_target: $dep");
    }
    $rels{$top_target} = "mS";                    # create sub-makefile target @prev_sub_makefiles = ();
    @top_target_depends = ();

Change all marked targets and references to them.

foreach $t (keys(%rels)) {
        ($rels{$t} =~ /^[mM][DTSA]/) || die "Bad target information";
        next if ($t eq $top_target);
        next if ($rels{$t} =~ /^.A/);             # abstracted away
        push(@prev_sub_makefiles, $t) if ($rels{$t} =~ /^.S/);

if ($rels{$t} =~ /^M/) {                   # marked
            if ($rels{$t} =~ /^.[DS]/) {           # dependency
                &change_log("Added1 $top_target: $t");
                #$rels{$top_target} .= " " . $t;
                push(@top_target_depends, $t);
            }
            elsif ($rels{$t} =~ /^.T/) {           # target (becomes abstracted)
                $rels{$t} =~ s/^MT/MA/;
                &change_log("Made-abstract $t");

@old_list = split(' ', $rels{$t});
                @new_list = (shift @old_list);     # skip target flag
                push(@new_list, $top_target);
                &change_log("Added2 $t. $top_target");

foreach $dep (@old_list) {
                    ($rels{$dep} =~ /^M[DTSA]/) || die "$dep: $rels{$dep},";
                    &change_log("Removed1 $t: $dep");
```

```perl
        }
        $rels{$t} = join(' ', @new_list);
    }
    else {
        die;
    }
}
elsif ($rels{$t} =~ /^m/) {              # not marked
    @old_list = split(' ', $rels{$t});
    @newer_list = (shift @old_list);     # save target flag
    @new_list = ();

foreach $dep (@old_list) {
        if ($rels{$dep} =~ /^m/) {       # not marked
            ($rels{$dep} =~ /^m[DTSA]/) || die "$dep: $rels{$dep},";
            &change_log("Kept-not-marked $t: $dep");
            push(@new_list, $dep);
        }
        elsif ($rels{$dep} =~ /^M[DS]/) { # marked sub-makefile
            &change_log("Kept-marked $t: $dep");
            push(@new_list, $dep);
        }
        elsif ($rels{$dep} =~ /^M[TA]/) { # marked non-sub-make
            &change_log("Removed2 $t: $dep");
            &change_log("Added3 $t: $top_target");
            push(@new_list, $top_target);
        }
        else {
            die "$dep: $rels{$dep},";
        }
    }

$prev = "";
    foreach $dep sort(@new_list) {
        if ($dep ne $prev) {
            push(@newer_list, $dep);
            $prev = $dep;
        }
        else {
            &change_log("Removed-same1 $t: $dep");
        }
    }
    $rels{$t} = join(' ', @newer_list);
}
else {
    die;
}
}                                        # foreach loop on keys

Optimize top_target dependencies.

@prev_depends = ();
foreach (@prev_sub_makefiles) {
    @tmp = split(' ', $rels{$_});
    shift @tmp;
    @prev_depends = (@prev_depends, @tmp);
}

@new_depends = ();
$prev = "";
top_dep_loop:
foreach $dep sort(@top_target_depends) {
    if ($dep ne $prev) {
        $prev = $dep;
        foreach (@prev_depends) {
            if ($_ eq $dep) {
                &change_log("Removed-optimized $top_target: $dep");
                next top_dep_loop;
            }
        }
        push(@new_depends, $dep);
    }
    else {
```

```
         &change_log("Removed-same2 $top_target: $dep");
      }
   }
   $rels{$top_target} = join(' ', ("mS", @new_depends));

return 1;                                    # changed makefile
}

Copy these lines to your main program to avoid TYPO warnings.

defined &addDir            || die;
defined &readMAKE          || die;
defined &abstract_makefile || die;
defined &print_abstracted  || die;
defined &clear_marks       || die;
defined &mark_targets      || die;

1
```

I claim:

1. In a computer system having at least one directory and a plurality of files therein, each file having a name, an apparatus for generating an abstracted dependency file for said directory, comprising:
  means for obtaining dependency information specifying dependency relationships between the files in said directory;
  means for identifying in said directory a main output file;
  means for determining which files said main output file is dependent upon and designating these files as input files;
  means for determining for each of said input files whether the input file is dependent upon another file;
  means for designating all input files which do not depend on any other file as leaf dependency files, and designating all input files which do depend on one or more other files as by-product files; and
  means for writing the names of said leaf dependency files, the name of said main output file, and the names of said by-product files into an abstracted dependency file, said abstracted dependency file indicating said main output file as being dependent upon said leaf dependency files, and indicating said by-product files as being dependent upon said main output file.

2. In a computer system having a plurality of directories with each directory having a plurality of files, each file having a name, an apparatus for generating an abstracted dependency file for all of the directories in said system, comprising:
  means for selecting a directory for processing;
  means for obtaining dependency information specifying dependency relationships between the files in the selected directory;
  means for identifying a main output file in the selected directory;
  means for determining while files said main output file is dependent upon and designating these files as input files;
  means for determining for each of said input files whether the input file is dependent upon any other files;
  means for designating all input files which do not depend on any other file as leaf dependency files, and designating all input files which do depend on one or more other files as by-product files;
  means for writing the names of said leaf dependency files, the name of said main output file, and the names of said by-product files into an abstracted dependency file, said abstracted dependency file indicating said main output file as being dependent upon said leaf dependency files, and indicating said by-product files as being dependent upon said main output file; and
  means for causing all of the directories in said system to be processed such that after all of the directories have been processed, said abstracted dependency file contains abstracted dependency information for all of said directories in said system.

3. In a computer system having at least one directory and a plurality of files therein, each file having a name, a computer implemented method for generating an abstracted dependency file for said directory, comprising the steps of:
  (a) obtaining dependency information specifying dependency relationships between the files in said directory;
  (b) identifying in said directory a main output file;
  (c) determining which files said main output file is dependent upon and designating these files as input files;
  (d) determining for each of said input files whether the input file is dependent upon any other file;
  (e) designating all input files which do not depend on any other file as leaf dependency files, and designating all input files which do depend on one or more other files as by-product files; and
  (f) writing the names of said leaf dependency files, the name of said main output file, and the names of said by-product files into an abstracted dependency file, said abstracted dependency file indicating said main output file as being dependent upon said leaf dependency files, and indicating said by-product files as being dependent on said main output file.

4. In a computer system having a plurality of directories with each directory having a plurality of files, each file having a name, a computer implemented method for generating an abstracted dependency file for all of the directories in said system, comprising the steps of:
  (a) selecting a directory for processing;
  (b) obtaining dependency information specifying dependency relationships between the files in the selected directory;
  (c) identifying a main output file in said selected directory;
  (d) determining which files in said selected directory said main output file is dependent upon and designating these files as input files;

(e) determining for each of said input files whether the input file is dependent upon any other file;

(f) designating all input files which do not depend on any other file as leaf dependency files, and designating all input files which do depend on one or more other files as by-product files;

(g) writing the names of said leaf dependency files, the name of said main output file, and the names of said by-product files into an abstracted dependency file, said abstracted dependency file designating said main output file as being dependent upon said leaf dependency files, and designating said by-product files as being dependent on said main output file; and (h) repeating steps (a) through (g) to process all directories in said system such that after all of said directories are processed, said abstracted dependency file contains abstracted dependency information for all of said directories in said system.

* * * * *